United States Patent [19]

Thomas

[11] Patent Number: 4,540,218
[45] Date of Patent: Sep. 10, 1985

[54] SAFETY BELT SYSTEM FOR CHILDS CHAIR

[75] Inventor: Rudy V. Thomas, Sterling Heights, Mich.

[73] Assignee: Allied Corporation

[21] Appl. No.: 501,325

[22] Filed: Jun. 6, 1983

[51] Int. Cl.³ .................. A47D 13/08; A47D 15/00
[52] U.S. Cl. .................. 297/467; 24/198; 24/199; 297/464; 297/468; 297/484
[58] Field of Search .......... 297/484, 483, 464, 468, 297/467; 24/169, 662, 618, 630, 631, 632, 574, 198, 199; 244/122 B, 151 A, 151 B

[56] References Cited

U.S. PATENT DOCUMENTS

| | | | |
|---|---|---|---|
| 518,833 | 4/1894 | Cooper | 24/199 |
| 745,884 | 12/1903 | Morton | 24/198 |
| 779,279 | 1/1905 | Hastings | 24/200 |
| 837,103 | 11/1906 | Nonnemacher | 24/570 |
| 1,541,701 | 6/1925 | Gaunt | 24/198 X |
| 2,108,716 | 2/1938 | Kuhlemann | 244/151 A |
| 2,817,393 | 12/1957 | Mitchell | 297/484 |
| 3,206,247 | 8/1965 | Johnson | 297/254 |
| 3,325,213 | 6/1967 | Levy | 297/389 |
| 3,408,708 | 11/1968 | Hawie | 24/199 |
| 3,709,558 | 6/1973 | Jokob | 297/250 |
| 3,791,694 | 2/1974 | Roberts et al. | 297/250 |
| 3,910,634 | 9/1975 | Morris | 297/384 |
| 3,934,934 | 1/1976 | Farrell, Jr. et al. | 297/384 |
| 3,954,280 | 5/1976 | Roberts et al. | 280/744 |
| 3,992,056 | 11/1976 | Koziatek et al. | 297/250 |
| 4,033,622 | 7/1977 | Boudreau | 297/250 |
| 4,112,865 | 9/1978 | Carn | 244/151 A |
| 4,186,961 | 2/1980 | Farrell, Jr. et al. | 297/216 |
| 4,302,049 | 11/1981 | Simpson | 244/122 B |
| 4,402,548 | 9/1983 | Mason | 297/484 |

FOREIGN PATENT DOCUMENTS 262553 2/1929 Italy .................. 24/200

Primary Examiner—James T. McCall
Attorney, Agent, or Firm—James R. Ignatowski; Russel C. Wells

[57] ABSTRACT

A child chair adapted to be secured by conventional vehicle seat belt systems. The chair is provided with a safety belt system including a belt which is attached to the chair and a combined tongue and anchor plate to form a lap belt portion and a pair of shoulder belt portions. The safety belt system also includes a tongue latch which is connected to the chair by means of a crotch belt and releasably connects to the tongue.

6 Claims, 5 Drawing Figures

SAFETY BELT SYSTEM FOR CHILDS CHAIR

BACKGROUND OF THE INVENTION

This invention relates generally to a child chair adapted to be secured by conventional vehicle seat belt systems, and more particularly to a safety belt system for use with such a chair.

Safety belt systems which are intended to restrain children frequently incorporate a pair of shoulder belts as well as a lap belt and a crotch belt. Examples of such systems are disclosed in U.S. Pat. No. 3,992,056 issued on Nov. 16, 1976, in the name of J. P. Koziatek et al., U.S. Pat. No. 4,033,622 issued on July 5, 1977, in the name of R. J. Boudreau and U.S. Pat. No. 4,186,961 issued on Feb. 5, 1980, in the name of C. S. Farrell, Jr. et al.

All of the safety belt systems of which I am aware have three to five components in addition to the main belt or pair of belts and the crotch belt. Due to the large number of components such systems tend to be relatively expensive.

BRIEF SUMMARY OF THE INVENTION

The invention includes a child chair adapted to be secured by any conventional vehicle seat belt system and provided with a safety belt system.

According to the preferred embodiment of the invention, the safety belt system includes a tongue latch connected to the chair by a crotch belt, a belt attached to the chair and a combined tongue and anchor plate which is releasably connectable to the tongue. The belt is adjustably connected adjacent each end to the plate and disposable in a slot in the plate to form with the plate a lap belt portion and a pair of shoulder belt portions. Further, the tongue latch cooperates with the plate to block the slot opening and so retain the belt in the slot.

It is a principal object of this invention to provide a less expensive safety belt system for child chairs which also is easy to use and lightweight.

The above and other objects, features and advantages of my invention will become apparent upon consideration of the specification and the appended drawing.

DETAILED DESCRIPTION OF THE PREFERRED EMBODIMENT

Figure 1:
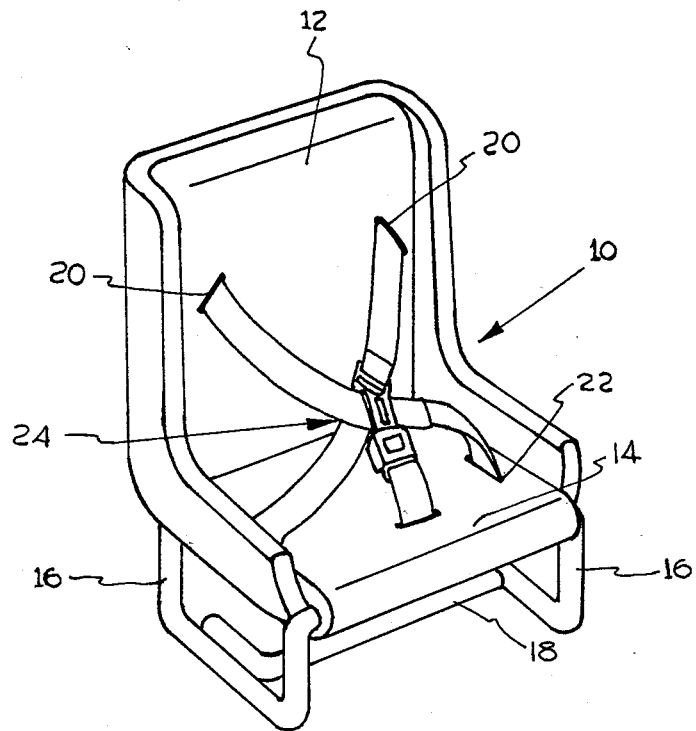
FIG. 1 is a front quarter perspective of a child chair provided with a safety belt system of my invention.

Referring to FIG. 1, the reference numeral 10 denotes a child chair which includes a back 12 and a seat 14. Attached to seat 14 is a pair of U-shaped legs or supports 16 connected by a cross brace 18.

Chair 10 is adapted to be secured or held in place by passing a conventional seat belt through supports 16 as is commonly done to secure such chairs. Chair 10 also is provided with a pair of slots 20 in back 12 and a pair of slots 22 (only one of which can be seen) in seat 14.

Figure 2:
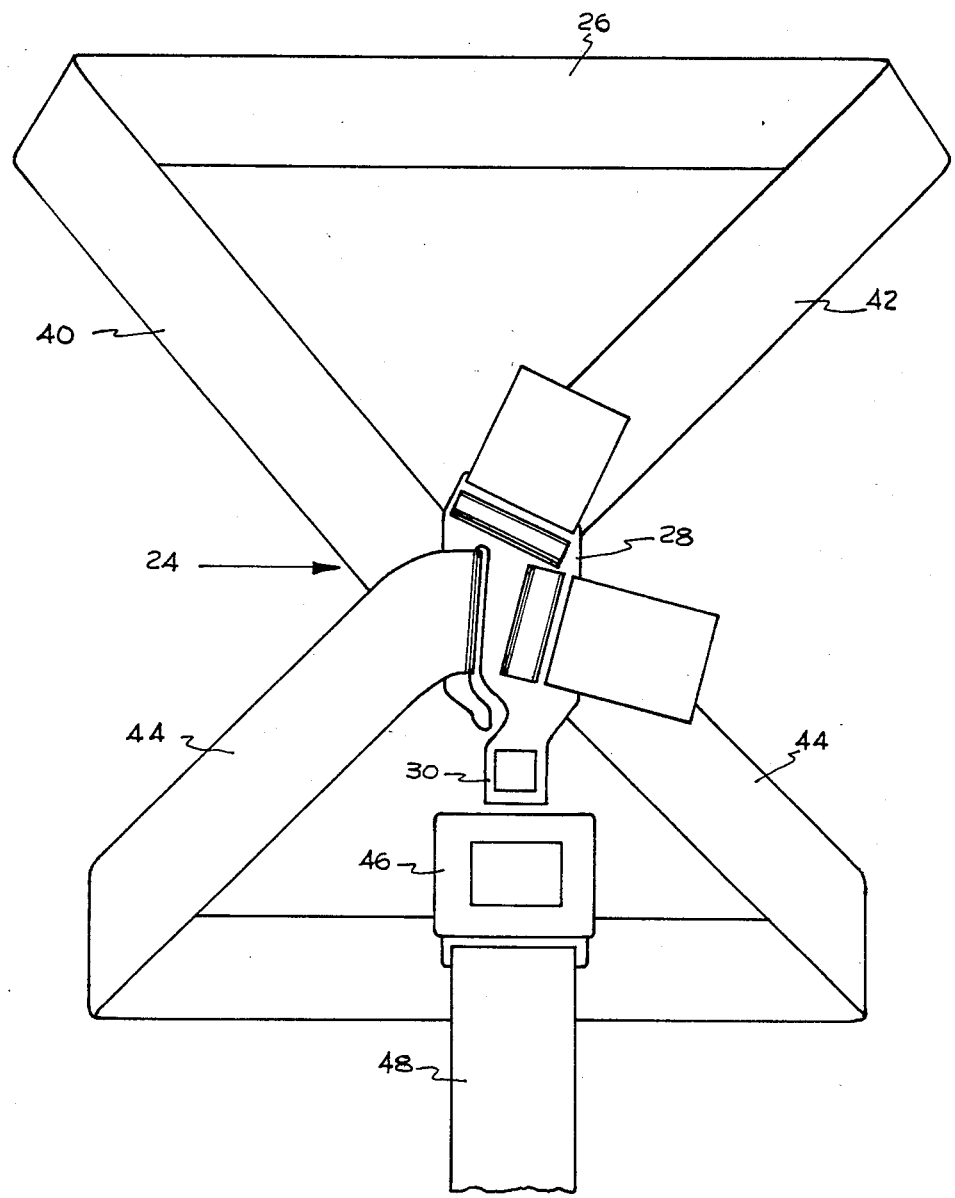
FIG. 2 is a view of my safety belt system removed from the associated child chair and showing the tongue latch and combined tongue and anchor plate in the unlatched condition.
Figure 3:
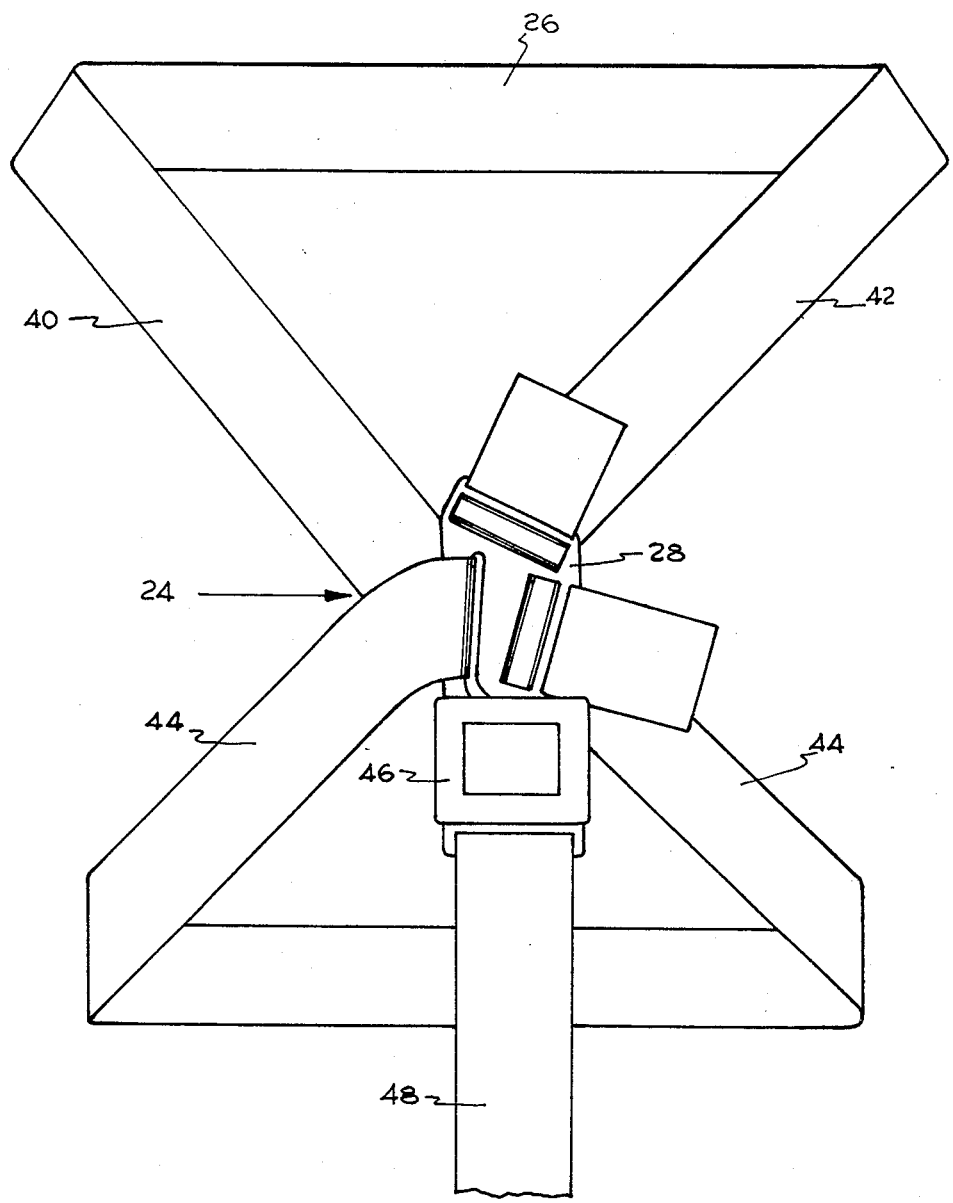
FIG. 3 is similar to FIG. 2, but with the tongue latch connected to the combined tongue and anchor plate.

Referring now also to FIGS. 2 and 3, it will be seen that chair 10 is provided with a safety belt system 24. System 24 includes a belt 26 which passes through slots 20 and 22 as shown in FIG. 1 so that belt 26 is slidably attached to back 12 and seat 14 of chair 10. Belt 26 is adjustably connected adjacent its ends to a combined tongue and anchor plate 28.

Figures 4, 5:
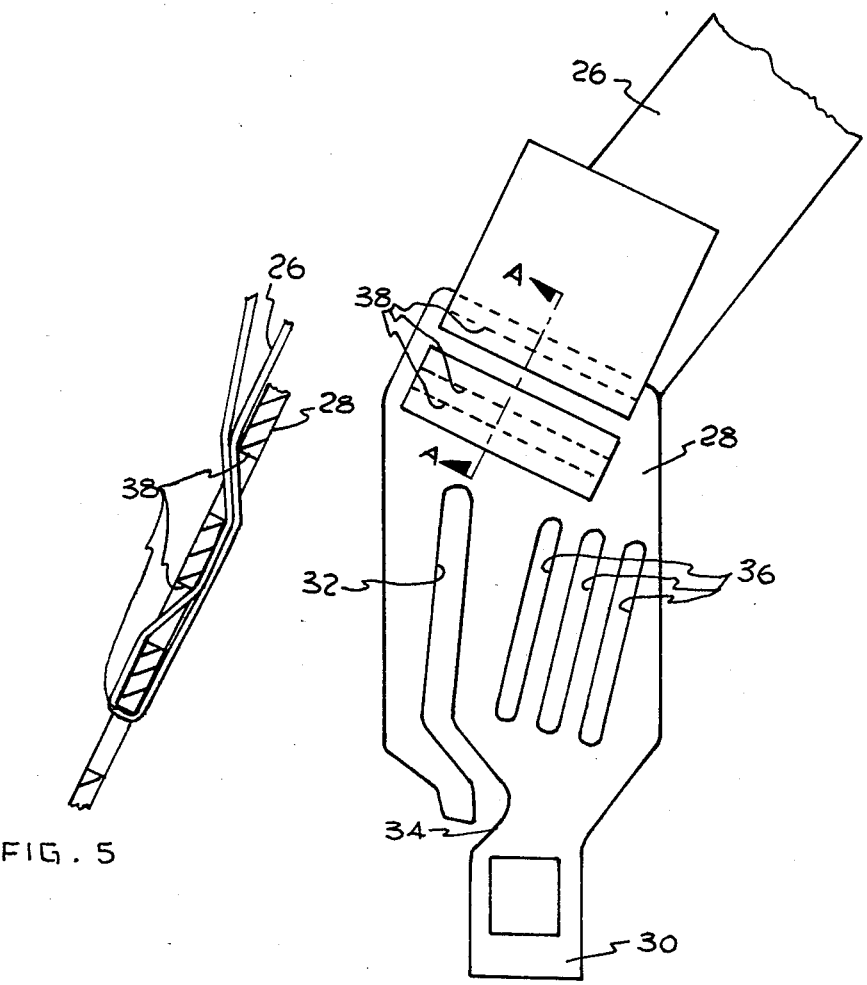
FIG. 4 is a detailed view on an enlarged scale of the combined tongue and anchor plate.
FIG. 5 is an enlarged cross section taken along A—A of FIG. 4.

Combined tongue and anchor plate 28, as can best be seen from FIG. 4, is provided with a tongue 30 and a slot 32 with an opening 34 in the perimeter of plate 28 adjacent tongue 30. Plate 28 also includes a set of three parallel slots 36 and a set of three parallel slots 38. Slots 36 and 38 serve as means to adjustably connect the ends of belt 26 to anchor plate 28 by training belt 26 through the slots in the arrangement shown in FIG. 5.

By disposing a portion of belt 26 in slot 32, as shown in FIGS. 1-3, belt 26 is, in effect, divided into a pair of shoulder belt portions 40 and 42 and a lap belt portion 44.

Safety belt system 24 also includes a tongue latch 46 to which tongue 30 can be releasably connected. Tongue latch 46 is connected to a crotch belt 48 which in turn is anchored to seat 14. As will be noted from FIG. 3, when combined tongue and anchor plate 28 is connected to tongue latch 46, the opening 34 of slot 32 is blocked so that belt 26 cannot be displaced from slot 32.

OPERATION

It will be assumed that chair 10 is secured in place by the vehicle safety belt system. If it is desired to place a child in seat 10 and restrain the child in the seat by means of safety belt system 24, the tongue latch 46 is released from combined tongue and anchor plate 28 and belt 26 is removed from slot 32. The belt is then brought around each side of the child and belt 26 is disposed in slot 32 so that belt 26 is arranged as shown in FIG. 2. Tongue latch 46 then is connected to tongue 30, as shown in FIG. 3, so that displacement of belt 26 from slot 32 is prevented. The points of connection of belt 26 to plate 28 can then be adjusted to properly accommodate the size of the child in chair 10.

To take a child out of the chair it simply is necessary to release tongue latch 46 and then remove belt 26 from slot 32.

While only a single embodiment of my invention has been described, it will be understood that various modifications can be made to it without departing from the spirit and scope of my invention.

I claim:

1. A safety belt system for a chair having a seat and a back comprising:
   a latch having an entrance slot for receiving an anchor plate;
   a first length of seat belt webbing having one end attached to the chair's seat and the other end attached to said latch;
   an anchor plate having a tongue adapted to be received in said latch and locked therein, said anchor plate having a webbing slot provided along one edge thereof, said webbing slot having an open end adjacent to said tongue and received in said entrance slot when said tongue is inserted into said latch; and a second length of seat belt webbing slidably supported from opposite sides of the chair's seat and back, the ends of said second length of seat belt webbing connected to said anchor plate and an intermediate portion of said second length of seat belt webbing intermediate said chair's seat and back, removably received in said webbing slot.

2. The safety belt system of claim 1 wherein said second length of seat belt webbing is entrained through a first pair of slots provided on opposite transverse sides of the chair's back and a second pair of slots provided on opposite transverse sides of the chair's seat and wherein the end portions of said second length of seat belt webbing connected to said anchor plate are entrained through one slot each of said first and second pairs of slots on the same transverse side of the seat.

3. The safety belt system of claim 2 wherein the portion of said second length of seat belt webbing received in the webbing slot extends between the other slot of said first and second pair of slots on the other transverse side of said seat.

4. The safety belt system of claim 1 wherein at least one end of said second length of seat belt webbing is adjustably attached to said anchor plate.

5. An anchor plate for a safety belt system for a chair having a latch provided with a tongue aperture attached to the chair's seat and a length of seat belt webbing entrained through slots in opposite sides of the chair's seat and back, the anchor plate comprising:

a tongue portion adapted to be received into the tongue plate aperture of the latch and locked therein;

means for attaching the opposite ends of the length of seat belt webbing, extending from one side of the chair, to the anchor plate;

a web hook provided along one edge of the anchor plate forming web slots having an open end adjacent to said tongue portion, the end of said web hook adjacent to said open end of said web slot extending into said tongue aperture when said tongue is inserted into said latch, said latch closing the open end of said web slot, said web hook captivating the portion of said seat belt webbing extending between the slots provided in the seat and back on the other side of the chair.

6. The anchor plate of claim 5, wherein said means for attaching the ends of the length of the seat belt webbing to the anchor plate adjustably attaches the ends of the seat belt webbing to the anchor plate permitting the seat belt webbing to be adjusted according to the size of the chair's occupant.

* * * * *